Nov. 30, 1971   W. L. SHEPPARD   3,623,383
HYDRAULIC LINKAGE SYSTEM
Filed June 25, 1970   6 Sheets-Sheet 1
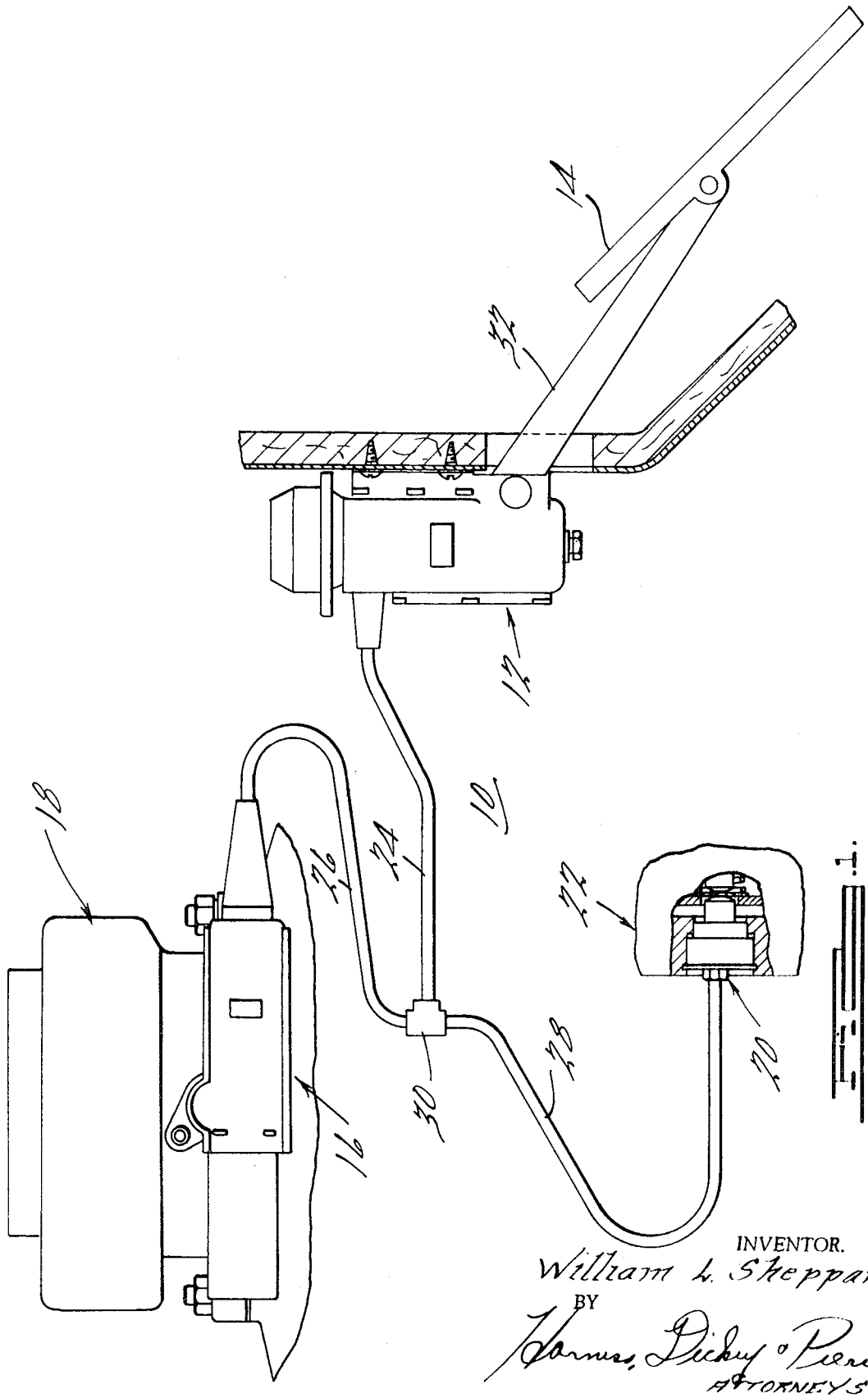
INVENTOR.
William L. Sheppard
BY
Harness, Dickey & Pierce
ATTORNEYS

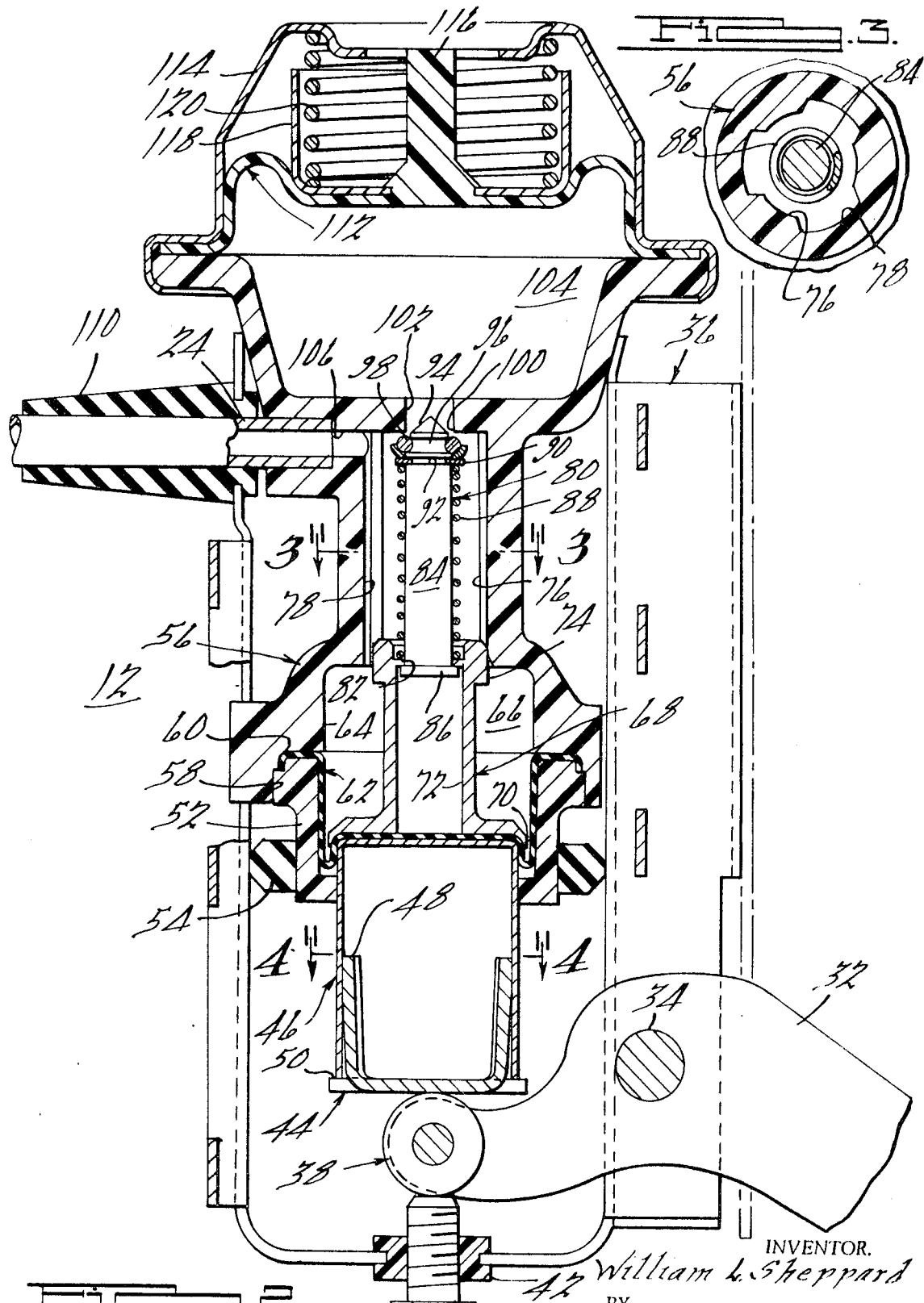

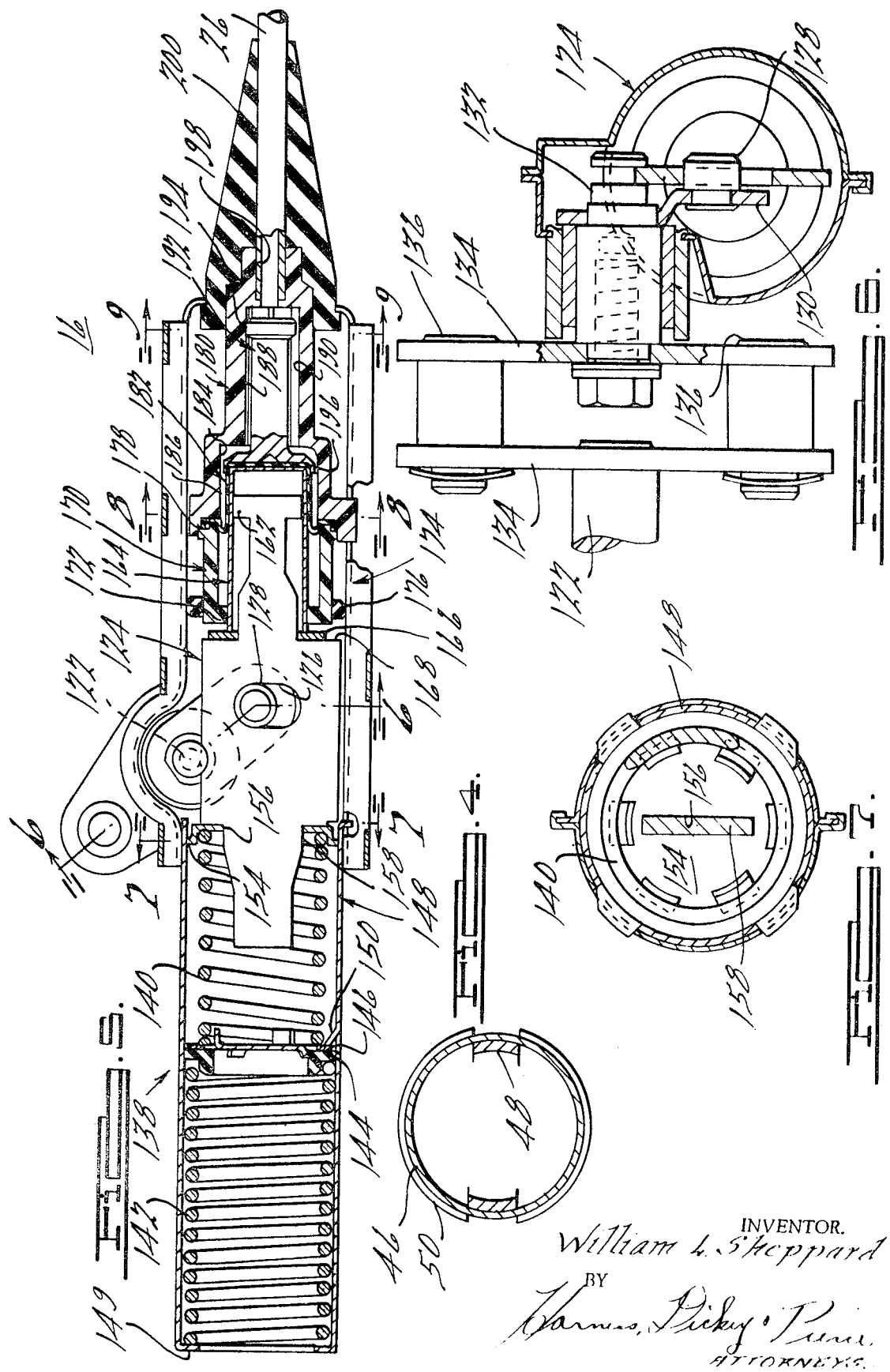

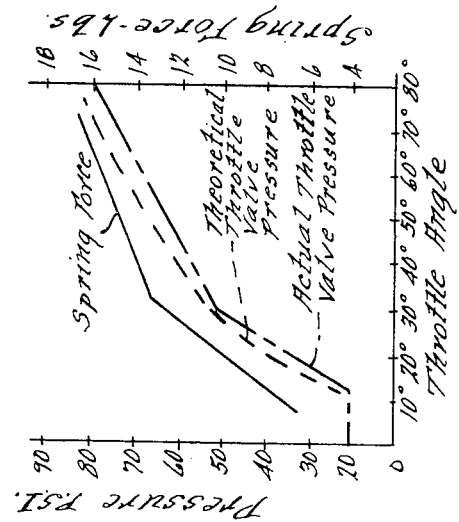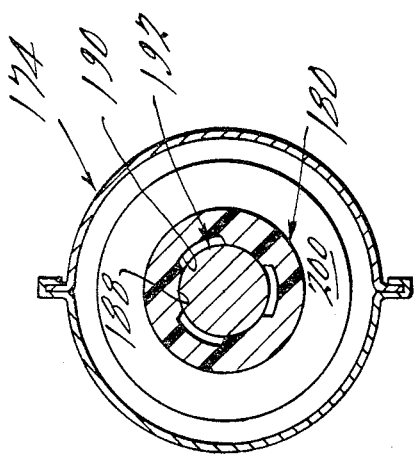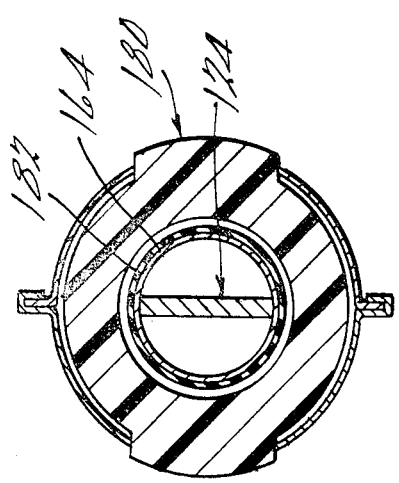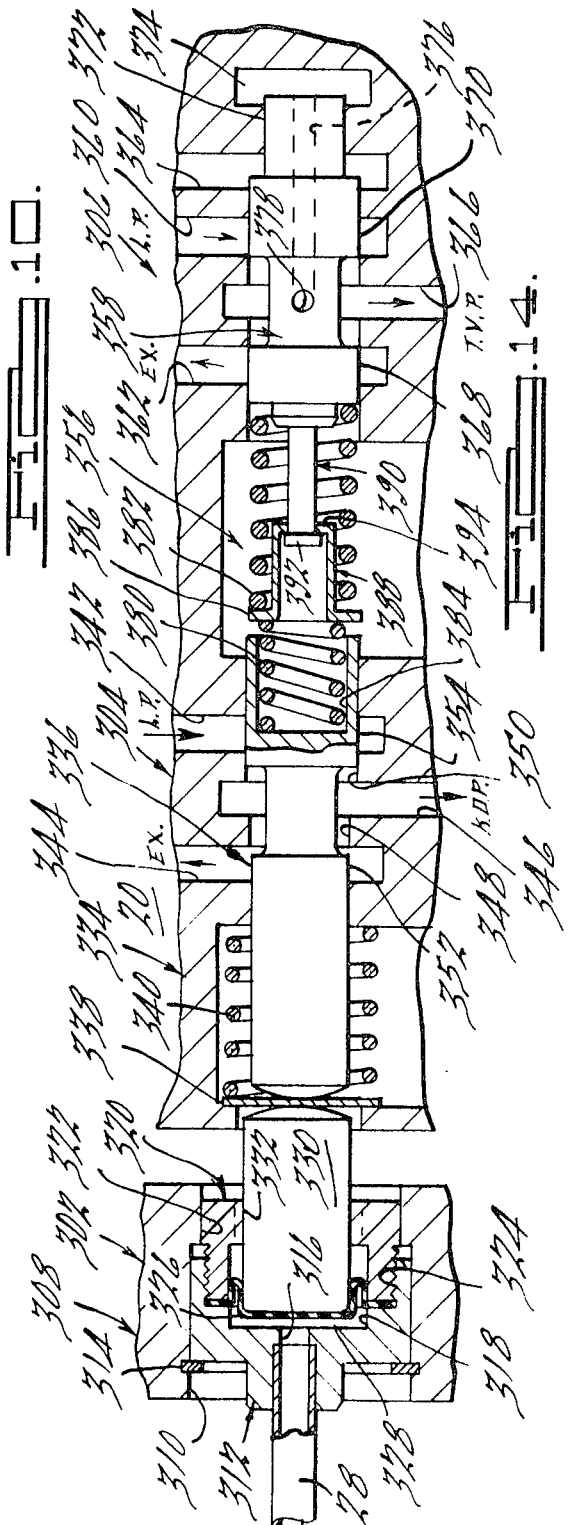

Nov. 30, 1971 — W. L. SHEPPARD — 3,623,383
HYDRAULIC LINKAGE SYSTEM
Filed June 25, 1970 — 6 Sheets-Sheet 5
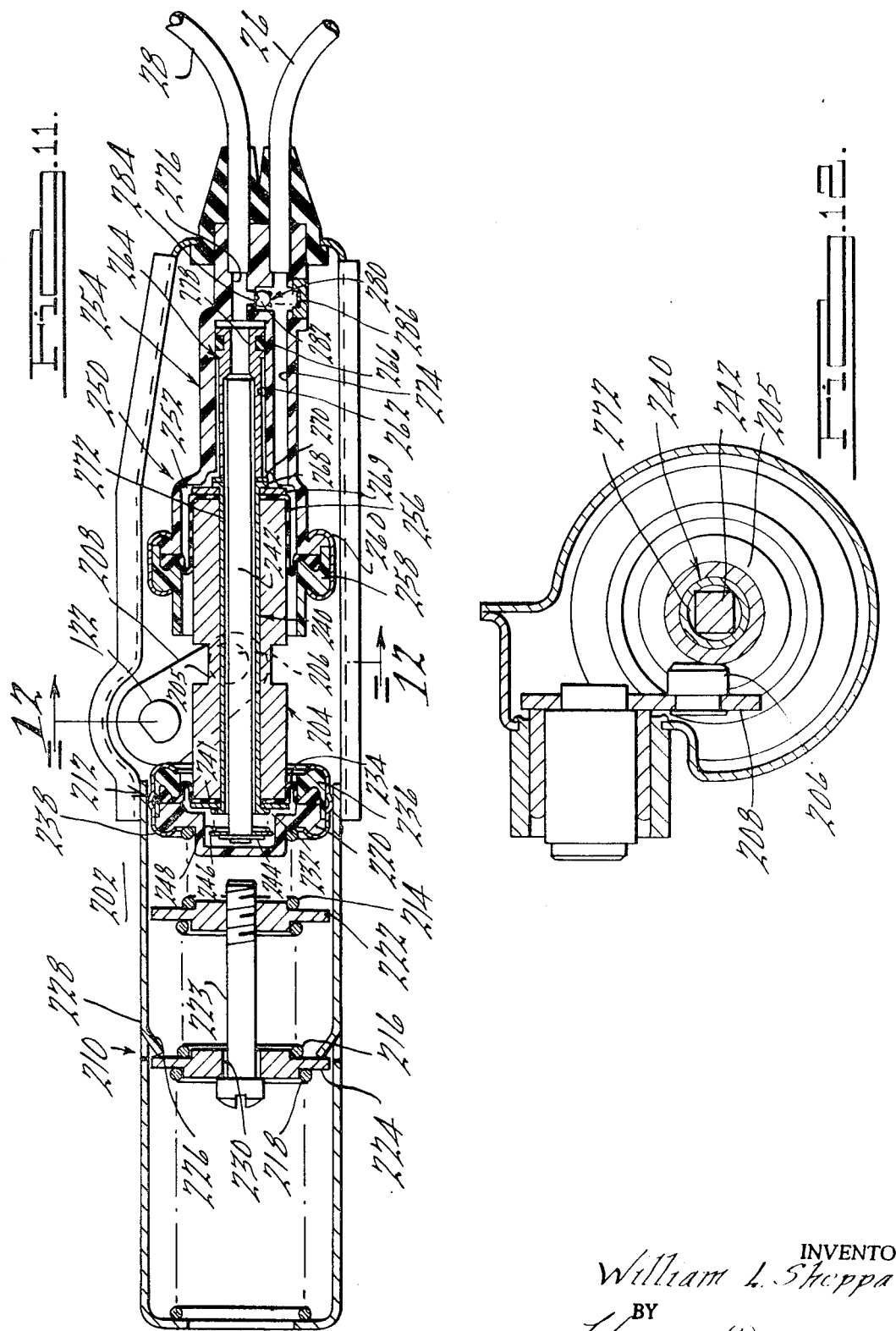
INVENTOR.
William L. Sheppard
BY
ATTORNEYS INVENTOR.
William L. Sheppard
BY
Harness, Dickey & Pierce
ATTORNEYS 3,623,383
HYDRAULIC LINKAGE SYSTEM
William L. Sheppard, 36655 Romulus Road,
Romulus, Mich. 48174
Filed June 25, 1970, Ser. No. 49,629
Int. Cl. F02d 11/08
U.S. Cl. 74—865                                46 Claims

ABSTRACT OF THE DISCLOSURE

A hydraulic linkage system particularly suitable for automobiles having an actuating transducer operated by the accelerator pedal for providing fluid in accordance with the pedal movement to responding transducers for the carburetor and the automatic transmission for the automobile. In a first embodiment, fluid from the master cylinder is delivered directly to the automatic transmission. In a second embodiment, the responding transducer for the carburetor has means for compensating for carburetor friction and for providing a compensated fluid pressure signal to the automatic transmission.

BACKGROUND OF THE INVENTION

(1) Field of the invention

Linkage suitable for use with automobiles for providing a signal to the carburetor and the automatic transmission thereof representative of accelerator pedal movement; and hydraulic linkage in general.

(2) Description of the prior art

In present day automobiles using automatic transmissions, means are required for coupling the accelerator pedal to the carburetor for operation thereof, and additionally, for providing a signal representative of accelerator movement to the automatic transmission to govern its shifting modes, preferably, according to engine torque. Generally, the linkages used are mechanical which are difficult to adjust, subject to excessive wear, and most importantly, subject to damage during the servicing of the automobile. Damage of the mechanical linkage between the carburetor and the automatic transmission has resulted in jamming of the throttle in a partially opened position which, under some circumstances, may cause the operator to lose control of the automobile. One of the ways in which the automotive industry has attempted to avoid this problem has been by substituting a vacuum-operated system for the previously used mechanically-operated system. More specifically, a vacuum line from the manifold of the engine has been connected to the transducer in the automatic transmission so as to control the automatic transmission in accordance with manifold vacuum of the engine. In the past, the manifold vacuum has been substantially representative of the torque output of the engine. However, by virtue of the recent addition of smog control devices, manifold vacuum now is much less representative of the torque output of the engine, and at times, misrepresentative of such output. Accordingly, the prior art systems wherein manifold vacuum has been used to provide an engine torque signal to the automatic transmission have proven to be disadvantageous since they do not provide a signal which is substantially representative of torque output of the engine.

SUMMARY OF THE INVENTION

The present invention provides a hydraulic linkage which is particularly suitable for use with automobiles for operating a carburetor in accordance with accelerator pedal movement and for providing a signal to the automatic transmission of the automobile representative of accelerator pedal movement. In general, the system of the present invention is an improvement over the system disclosed in my patent, No. 3,203,186, entitled "Force Transmitting System," issued Aug. 31, 1965. In the above patent, a sealed hydrostatic system including an actuating transducer connected to the accelerator pedal, a responding transducer connected to the actuating lever of the carburetor, and a hydraulic linkage connected therebetween, is disclosed for translating movement of an accelerator pedal to movement of a carburetor actuating lever to control the velocity of an automobile. The present invention additionally provides a novel hydraulic linkage which controls the shifting mode of the automatic transmission; an improved actuating transducer having a provision for replacing hydraulic fluid lost from the system; an improved responding transducer on the carburetor which has means for compensating for the non-linear relationship between carburetor actuating arm movement and engine torque so as to provide a system pressure, for delivery to the automatic transmission to control the shifting mode of the transmission, being better representative of engine torque; an improved transducer for the carburetor which compensates for carburetor friction to provide a compensated fluid pressure signal to control the shifting mode of the automatic transmission; and two embodiments of a responding transducer of novel construction for an automatic transmission.

BRIEF DESCRIPTION OF THE DRAWINGS

FIG. 1 is an illustration of a first exemplary system embodiment according to the present invention;

FIG. 2 is a side cross-sectional view of an exemplary actuating transducer according to the present invention for the accelerator pedal which may be used with the first or second system embodiments of the present invention;

FIG. 3 is a top cross-sectional view taken generally along the lines 3—3 of FIG. 2;

FIG. 4 is a top cross-sectional view taken generally along the lines 4—4 of FIG. 2;

FIG. 5 is a side cross-sectional view of a first exemplary responding transducer for a carburetor suitable for use with the first exemplary system embodiment of this invention;

FIG. 6 is an end cross-sectional view taken generally along the lines 6—6 of FIG. 5;

FIG. 7 is an end cross-sectional view taken generally along the lines 7—7 of FIG. 5;

FIG. 8 is an end cross-sectional view taken generally along the lines 8—8 of FIG. 5;

FIG. 9 is an end cross-sectional view taken generally along the lines 9—9 of FIG. 5;

FIG. 10 is a chart illustrating the method by which the spring rates and spring preloading within the carburetor responding transducer of FIG. 5 are derived;

FIG. 11 is a side cross-sectional view of a second exemplary responding transducer for a carburetor which has means for compensating for carburetor throttle friction so as to provide a compensated fluid signal to the automatic transmission responding transducer;

FIG. 12 is an end cross-sectional view taken generally along the lines 12—12 of FIG. 11;

FIG. 14 is a first exemplary embodiment of a responding transducer for a transmission suitable for use with the first and second exemplary system embodiments of this invention.

DETAILED DESCRIPTION OF THE PREFERRED EMBODIMENTS

In General

Figure 15:
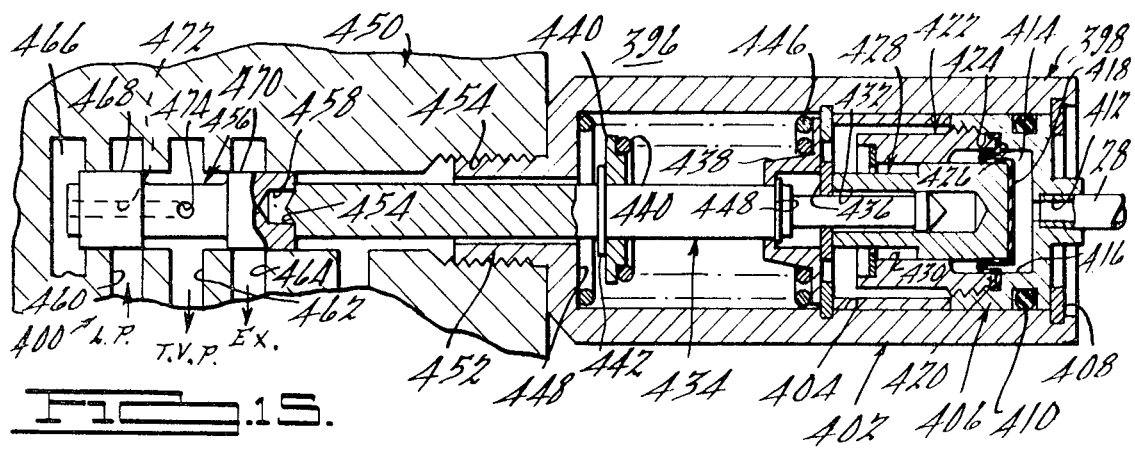
FIG. 15 is a second exemplary embodiment of a responding transducer for a transmission suitable for use with the first and second exemplary system embodiments of this invention.

In FIG. 1, a first exemplary system embodiment 10 for a vehicle according to the present invention is illustrated. The system 10 includes an actuating transducer 12 connected to the accelerator pedal 14 for the vehicle, a responding transducer 16 operatively connected to the throttle shaft of the carburetor 18, and a responding transducer 20 operatively connected to an automatic transmission 22 for the vehicle. The actuating transducer 12 is provided with an outlet line 24 for transmitting fluid to the carburetor responding transducer 16 and the transmission responding transducer 20 via lines 26 and 28, respectively, which may be connected to line 24 by a T-fitting 30. Thus, the accelerator pedal 14, the throttle of carburetor 18, and the transmission 22 are operatively connected by a liquid linkage.

Actuating Transducer

In FIG. 2, an actuating transducer 12 is illustrated in detail. More particularly, an arm 32, pivotally connected at 34 to a frame 36 for the actuating transducer 12, is provided which carries the accelerator pedal 14 at one end (as shown in FIG. 1) and a roller 38 at the other end. In the throttle-closed position, the roller 38 abuts a screw stop 40 which is mounted to the frame 36 by threaded engagement with a lock nut 42 carried by the frame 36. The roller 38 engages a follower cup 44 for a piston 46 which is located thereon by means of a pair of upwardly extending tabs 48 and a carrying surface 50 engaging the piston 46 as can be best seen in FIG. 4. The piston 46 is generally cylindrical and has a closed upper end. The piston 46 resides in and is slidably mounted with respect to a cylinder 52 which is preferably made of nylon or other low friction-coefficient material. For example, the cylinder 52 may have a radially inward extending flange engaging the cylindrical portion of the piston 46. The cylinder 52 is mounted to the frame 36 by means of an annular cylinder mount 54 which, in its position as shown, is radially compressed so as to securely position the cylinder with respect to the frame 36. The actuating transducer 12 further includes a main housing member 56 having a bell portion at each of its upper and lower ends. The lower bell portion has a cylindrical bore 58 accepting the cylinder 52 and a second cylindrical bore 60 accepting a rolling lobe diaphragm 62 which is securely held in compression between the bore 60 and the cylinder 52. With the construction shown, an efficient fluid seal is effected between the rolling lobe diaphragm 62 and a cylindrical bore 64 of the lower bell portion of the main housing member 56 so as to form a fluid-tight chamber 66 having a movable wall. As can be seen in FIG. 2, the rolling lobe diaphragm 62 crosses and engages the upper closed end of the piston 46. A piston guide 68 resides on the rolling lobe diaphragm 62 and is provided with an annular lip 70 radially engaging the rolling lobe diaphragm 62 at the outer diameter of the piston 46. The piston guide 68 has an internal cylindrical bore 72 for purposes hereinafter described and an external upper cylindrical portion 74 residing in a bore 76 of the main housing member 56 intermediate the upper and lower bell portions for reciprocatory motion therein. The bore 76 of the main housing member 56 is provided with axial grooves 78 which may be bore segments of increased diameter, as can be best seen in FIG. 3, so as to provide a plurality of flow passages. The piston guide 68 carries a makeup valve assembly 80 on a radially inward extending flange 82. The makeup valve assembly includes a valve stem 84 having a flange or head portion 86 engaging the radially inward flange 82 of the piston guide 68, as by a resilient force provided by a precompressed coiled spring member 88 abutting, at its upper end, a snap washer 90 engaged with a slot 92 in the valve stem and, at its lower end, the inwardly extending flange 82 of the piston guide 68. The valve stem 84 has a conical upper end 94 and an adjacent circular groove 96 carrying an O-ring seal 98. The O-ring seal 98 is adapted to engage a valve seat 100 formed by a cylindrical bore 102 in the housing 56 communicating a makeup chamber 104 in the upper bell portion with the chamber 66 in the lower bell portion of the main housing member 56 via the grooves 78. As can be seen in FIG. 2, upward movement of the piston guide 68 effects upward movement of the makeup valve assembly 80 and consequent engagement of the O-ring 98 on the valve seat 100. Additional upward movement of the piston guide 68 causes compression of the coiled spring member 88 and movement of the valve stem 84 into the cylindrical bore 72 of the piston guide 68.

The grooves 78 also provide communication between the chamber 66 and an outlet opening 106 in the main housing member 56. The outlet opening 106 is adapted to receive the outlet line 24 which is preferably provided with a line protector 110 carried on the frame 36.

The upper bell portion of the main housing member 56 is provided with a makeup chamber rolling lobe diaphragm 112 sealing the makeup chamber 104 which may be secured to the main housing member 56 by a cover 114 spun or crimped to the housing member 56. The diaphragm 112 has a resilient stem portion 116 which engages and secures a makeup cylinder piston 118. The piston 118 is resiliently biased downward against the diaphragm 112 by a makeup chamber coiled spring member 120 which engages the makeup piston 118 at its one end and the makeup chamber cover 114 at its other end. The resilient downward bias on the piston 118 establishes a minimum pressure within the makeup chamber 104 which serves to move the makeup valve stem 84 downwardly and introduce that pressure to the actuating chamber 66. As a result, the piston 46 is urged downwardly so as to act upon the accelerator arm 32 to return the accelerator pedal 14 to the upward or throttle closed position when the operator's pressure thereon is released.

In operation, depression of the accelerator pedal 14 causes rotation of the pedal arm 32 about the pivot 34 so as to move the roller 38 upwardly. Upward movement of the roller 38 provides upward movement of the follower cup 44, the piston 46, and consequently, the rolling lobe diaphragm 62 to decrease the volume of actuator chamber 66 providing forced flow of the fluid therewithin through the grooves 78. Upward movement of the piston 46 and rolling lobe diaphragm 62 causes upward movement of the piston guide 68 to close the O-ring 98 with the valve seat 100 shortly after inception of the upward movement so as to prevent more than minimal flow into the makeup chamber 104. Thereafter, continued depression of the accelerator pedal 14 causes forced egress through outlet line 24 in a quantity commensurate with the displacement of the pedal 14. Release of pressure on the accelerator pedal 14 causes forced return of the fluid in the outlet line 24, for reasons which will be explained hereinafter, which returns the piston 46 to a lowered position to open the valve between the O-ring 98 and the valve seat 100 thereby communicating the pressure within the makeup chamber 104 with the chamber 66 to return the accelerator pedal 14 to the throttle-closed position. At this time, any air within the system will move upward by virtue of its buoyant force and a corresponding amount of hydraulic fluid from the makeup chamber 104 will flow into the lower portion of the system to make up any hydraulic fluid loss. Similarly, any excess fluid, for example, from thermal expansion, will enter the chamber 104.

Carburetor Responding Transducer—First Exemplary Embodiment

In FIG. 5, a first exemplary embodiment of an actuating transducer for a vehicle carburetor is illustrated. The responding actuator 16 receives hydraulic fluid via an inlet line 26 and rotates a carburetor throttle plate shaft 122 in accordance with the amount of fluid received. The carburetor responding transducer 16 includes a push bar 124, having a generally flat cross-section, which includes a central vertical slot 126 receiving a crank arm pin 128 connected to a crank arm 130 which, as best can be seen in FIG. 6 is in turn affixed to the carburetor shaft 122 by means of a shaft 132, a pair of coupling plates 134, and a pair of drive lugs 136. Accordingly, reciprocatory movement of the push bar 124 will cause rotation of the crank arm 130 and consequent rotation of the carburetor throttle shaft 122. Those skilled in the art will appreciate that this is an adaptation of standard mechanical linkage for securing a first mechanical link extending from the accelerator pedal to the carburetor throttle shaft 122, and for securing a second mechanical link extending from the carburetor throttle shaft 122 to the automatic transmission of the vehicle. The push bar 124 is resiliently biased to the left by a two-stage return spring assembly 138. The return spring assembly 138 has a first-stage coiled spring member 140 and a second-stage coiled spring member 142. The first stage coiled spring member is of substantially higher rate, for example, 25.4 pounds per inch in one embodiment, while the second-stage spring is of lower rate, for example, 10 pounds per inch in the aforementioned embodiment. Each stage is precompressed when the carburetor is in the throttle-closed position. More specifically, the second stage is restrained in a precompressed state by engagement with a second stage spring guide 144 at one end and a radially inwardly extending flange 149 on the return spring housing 148 at the other end. The second stage spring guide 144 carries a left first stage spring guide 146 engaging an inwardly extending tab 150 integral with the return spring housing 148 to restrain rightward movement of the second stage spring guide 144 to hold the second stage spring 142 in precompression. The first stage return spring 140 bears against the first stage spring left guide 146 at its one end and against the first stage spring right guide 154 at its other end. The guide 154 has a narrow rectangular opening 156, as can be best seen in FIG. 7, accepting a projecting portion 158 of the push bar 124. The first stage return spring 140 is prestressed in compression by throttle stop of the carburetor which prevents rightward movement of the push bar 124 in addition to that shown. The precompression of the springs 140 and 142 is established such that the precompression of the second stage spring 142 is the greater. Accordingly, the first stage spring 140 will be compressed a certain amount by leftward movement of the push bar 124 prior to the inception of compression of the second stage spring 142. However, since the second stage spring 142 is of lower rate than the first stage spring 140, the combined rate of resistance of the springs 142 and 140 will be less at the inception of compression of the second stage spring 142. This variation in spring rates and precompression establishes a combined spring rate characteristic for the return spring assembly 138 which is tailored to provide a substantially linear relationship between the hydraulic pressure supplied to the responding transducer 20 for the automatic transmission and engine torque, as will be better appreciated in view of the description of the chart of FIG. 10 appearing below.

The push bar 124 has a right end portion 162 adapted to closely cooperate with and reside in an internal bore of a responding transducer piston 164, as can be best seen in FIG. 8. The piston 164 has a closed right end and an opened left end abutting a piston washer 166 which in turn abuts a shoulder 168 on the push bar 124. The piston 164 is mounted for reciprocatory movement in a cylinder 170, for example, by means of radially inward extending flanges 172 engaging the piston 164. The cylinder 170 is mounted within a housing 174 for the responding transducer 16 by means of a cylinder mount 176. The cylinder 170 is provided with a radially outward extending flange 178 engaging a main housing member 180 and sealingly clamping a rolling lobe diaphragm 182 therebetween. The main housing member 180 has an enlarged cylindrical bore portion 184 which, with the rolling lobe diaphragm 182, forms a variable volume chamber 186 including a movable wall. The main housing member 180 still further has a smaller cylindrical bore 188 having a plurality of axially extending grooves 190 which may be segments of greater diameter. A piston guide 192 is disposed within the main housing member 180 and has an enlarged cylindrical portion 194 at one end engaging the cylindrical bore portion 188 of the main housing member 180 to be guided thereby, as can be best seen in FIG. 9, and an enlarged section having an axially extending flange 196 at its other end engaging the rolling lobe diaphragm 182 at the outer diameter of the piston 164. The main housing member 180 has an inlet bore portion 198 communicating the inlet line 26 with the variable volume chamber 186 via the axially extending grooves 190. The inlet line 26 is provided with a line protector 200 secured to the housing 174 to prevent excessive bending of line 26 at its juncture with the responding transducer 16.

With reference now to FIG. 10, the manner in which the preloading and spring rates for the first and second stages of the variable rate spring assembly 138 will be discussed. The desired throttle valve pressure, which is utilized by the automatic transmission to control the shifting mode of the transmission, is illustrated by the dashed line. For present purposes, it can be presumed that throttle valve pressure is substantially related to the pressure delivered to the automatic transmission responding transducer 20 on inlet line 28. As can be seen in FIG. 10, the desired throttle valve pressure is a continuous curve which, in practice, is difficult to duplicate exactly. As an expedient, throttle valve presure relationship is approximated as two straight segments. Accordingly, the pressure within the system 10 delivered to the automatic transmission responding transducer 20 should have this relationship with respect to carburetor opening. Each of the straight segments is established by one of the two stages of the variable rate spring assembly 138. More specifically, the lower or first straight segment is provided by the spring rate and precompression of the first stage of the variable rate spring assembly 138 as indicated by the solid spring force line, and the upper straight segment of the curve is duplicated by the second stage spring of the variable rate spring asembly 138 so as to yield the decreased spring rate above the precompression level of the second rate spring, i.e., above approximately 32° of throttle opening.

In operation, fluid delivered to the actuating chamber 186 results in expansion of that chamber and consequent movement of the actuating piston 164 and the push bar 124 to the left so as to rotate the throttle shaft 122. Movement of the push bar 124 to the left will cause compression of the first stage spring 140 in accordance with the pressure within the actuating chamber 186. It will be appreciated that fluid pressure within the actuating chamber 186 is a function of the force provided by the return spring assembly 138, the throttle valve spring on shaft 122 acting through the crank arm 130 and following pin 128, and any frictional force also acting through the crank arm 130 and the following pin 128 caused by the mounting bearings of the throttle shaft 122 and any associated mechanism. Then, within certain limits depending upon the magnitude of the carburetor friction, the fluid pressure within the chamber 186, and accordingly, the fluid pressure within the inlet line 26 and the system 10 generally is a function of the amount of compression of the variable rate spring 138, i.e., the amount of throttle opening of the carburetor. Continued delivery of fluid to the actuating chamber 186 and consequent presure buildup therein causes continued movement of the push bar 124 to the left and further compression of the variable rate spring assembly 138. When the precompression of the second stage spring member 142 is exceeded, the second stage spring member 142 will be compressed so as to modify the spring rate of the return spring assembly 138 in accordance with the lower spring rate of the second stage spring member 142. This modified spring rate will be reflected as a modified rate of increase in the fluid pressure within the actuating chamber 186, and therefore, in a modified increase in the fluid pressure delivered to the automatic transmission responding transducer 20.

Carburetor Responding Transducer—Second Exemplary Embodiment

In FIG. 11, a second embodiment 202 of a carburetor responding transducer is shown which compensates for carburetor throttle friction and provides a compensated pressure signal to the automatic transmission responding transducer 20. The responding actuator 202 receives hydraulic fluid via the inlet line 26 and rotates a carburetor throttle plate shaft 122. The carburetor responding transducer 202 includes an actuating piston 204 which has a generally circular cross section and includes an intermediate reduced diameter portion or groove 205 receiving a crank pin 206 connected to a crank arm 208. The crank arm 208 is affixed to the carburetor throttle shaft 122, for example, by means of a flat thereon as illustrated. It will be appreciated that reciprocatory movement of the actuating piston 204 will cause rotation of the crank arm 208 and consequent rotation of the carburetor throttle shaft 122.

Figure 13:
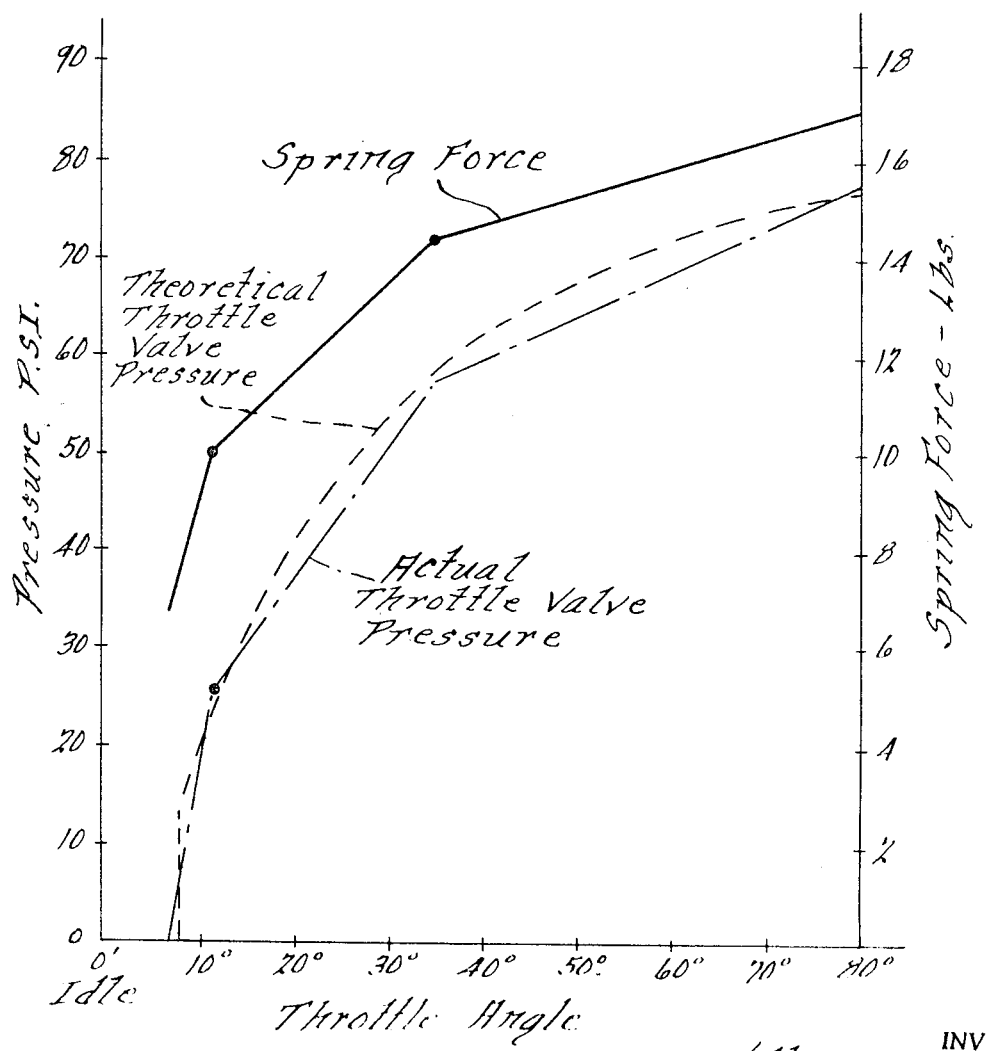
FIG. 13 is a chart illustrating the method by which the spring rates and spring preloading within the carburetor responding transducer of FIG. 10 are derived.

The carburetor responding actuator 202 is provided with a variable rate spring assembly 210 which resiliently bears upon the actuating piston 204 through a fluid coupling 212, the purpose of which will be explained in detail hereinafter. The variable rate spring assembly 210 is a three stage assembly having a first stage coiled spring member 214, a second stage coiled spring member 216, and a third stage coiled spring member 218. As will be appreciated in view of the discussion with respect to FIGS. 5 and 10, the variable rate spring assembly 210 approximates the torque output characteristics of the engine so that the fluid pressure delivered to the automatic transmission responding transducer 20 is approximately related to the torque delivered by the engine of the vehicle. It has been found that in some cases, a three stage variable rate spring assembly is better suited for approximating the torque output characteristics of the vehicle engine. Preferably, the spring of each stage is successively lower in spring rate and successively higher in precompression. More specifically, with reference to the curve of FIG. 13, which illustrates the spring rate as a function of throttle angle, and accordingly, illustrates spring rate as an approximate function of leftward movement of the actuating piston 204 causing compression of the variable rate spring assembly 210, the selection of the spring rate and precompressions of the springs will be discussed. The desired throttle valve pressure for controlling the shifting mode of the automatic transmission is illustrated by means of a dashed line as shown. This line is approximated by three straight segments. From this approximation, the actual throttle valve pressure, and accordingly, the pressure required to be delivered to the transmission responding transducer 20 or the inlet line 28 are determined which determines the spring rate and precompression of the spring members 214–218 of variable rate spring assembly 210 as explained with respect to FIG. 10.

The three stage return spring assembly 210 includes a first stage spring guide 220, having rightward movement limited by the carburetor stop, which accepts one end of the first stage spring 214. The variable rate return spring assembly 210 further includes a second stage spring guide 222, accepting the other end of the first stage spring 214 on one side, which has rightward movement limited by a threadedly engaged bolt 223. The second stage return spring guide 222 accepts the second stage return spring on its other side. A third stage spring guide 224 is provided which has rightward movement limited by inwardly projecting tabs 226 which are integral with a housing 228 for the return spring assembly 210 which accepts the second stage return spring 216 at one side and the third stage return spring 218 at its other side. The other end of the third stage spring 218 engages the radially inward flange at the end of the return spring assembly housing 228. The third stage spring guide 224 has an internal bore 230 slidably accepting the bolt 223 such that rightward movement of the second stage spring guide 222 is limited by engagement of the bolt head with the third stage spring guide 224. In view of the above described construction, it will be appreciated that each of the springs 214–218 are held in precompression such that further compression of each spring depends upon the force supplied to the variable rate return spring assembly 210.

The fluid coupling 212 connecting the variable rate spring assembly 210 to the piston 204 includes a fluid chamber 232 formed by the first stage spring retainer 220 and a rolling lobe diaphragm 234. The rolling lobe diaphragm 234 is sealingly engaged with the first stage spring retainer 220 by a diaphragm retainer 236 having an annular grove confronting the first stage spring retainer 220 which receives an enlarged radially outward portion of the diaphragm 234. The diaphragm retainer 236 is secured to the first stage spring retainer 220 by an annular member 238 crimped as shown so as to maintain the sealing engagement of the first stage spring retainer 220 with the rolling lobe diaphragm 234. The rolling lobe diaphragm 234 rests against the left end of the actuating piston 204 so as to substantially radially locate the piston 204 and to be movable in accordance with reciprocatory movement of the piston 204 in response to fluid pressure signals received by the responding transducer 202. The actuating piston 204 is provided with an internal bore closely accepting a tubular rivet 240 which has an opening at its left end communicating with the chamber 232. The tubular rivet 240 is secured to the rolling lobe diaphragm and actuating piston 204 by a radially outward rolled flange engaging a washer 241 on the rolling lobe diaphragm 234 as shown. The tubular rivet 240 contains a valve operating bar 242 which may be of rectangular cross section as can be best seen in FIG. 12. The bar 242 extends into the chamber 232 such that its left end is positioned closely adjacent the first stage coiled spring retainer 220. The bar 242 is provided with a snap ring 244 and an adjacent washer 246 extending radially outward from the bar 242 so as to provide an abutting member for one end of a coiled spring member 248. The other end of the coiled spring member 248 abuts the washer 241 on the rolling lobe diaphragm 234 so as to resiliently bias the valve actuating bar 242 to the left.

The carburetor responding transducer 202 further includes an actuating section 250 coperating with the right end of the actuating piston 204 to provide leftward movement thereof and consequent opening of the carburetor throttle valve in response to depression of the accelerator pedal 14. The actuating assembly 250 has a chamber 252 for receiving hydraulic fluid from the inlet line 26 which is formed by a housing member 254 and a rolling lobe diaphragm 256 sealingly engaged with the housing member 254, for example, by a diaphragm retainer 258 and a crimped or spun annular clip 260 as previously described. The housing member 254 has a cylindrical bore 262 containing a valve member 264 disposed for reciprocatory movement therein. The valve member 264 is provided with an O-ring 266 to effect a fluid seal between the right end of the valve member 264 and the cylindrical bore 262. The valve member 264 is affixed to the right end of the valve actuating bar 242 so as to be movable thereby.

As can be seen in the figure, the right end of the tubular rivet 240 is provided with a head or outwardly extending flange 268 so as to secure the tubular member 240 to the rolling lobe diaphragm 256 and the actuating piston 204. Preferably, a washer 269 is interposed between the rolling lobe diaphragm 256 and the rivet head 268 as shown. A washer 270 is disposed intermediate the tubular rivet flange 268 and the left end of the valve member 264 so as to form a fluid seal between an axial passage 272 and the actuating chamber 252 which is resiliently biased close by the spring 248. As can be best seen in FIG. 12, the axial passage 272 is formed by the clearance between the square cross section of the actuating bar 242 and the cylindrical bore of the tubular rivet 240 and a bore of equal diameter in the valve member 264.

The housing 254 is further provided with a fluid inlet opening 274 communicating with the inlet line 26 and a fluid outlet opening 276 communicating with the axial passage 272 through a bore 278 in the valve member 264. The fluid outlet passage 276 is connected to the line 28 communicating with the automatic transmission responding transducer. A check valve assembly 280 including a ball valve 282 resiliently biased against a valve seat 284 by a light coil spring member 286 is connected between inlet passage 274 and outlet passage 276, to relieve fluid pressure in the line 28 when the pressure in inlet 26 is relieved by return of the accelerator pedal 14.

In view of the foregoing description of the carburetor responding transducer 202, it will be appreciated that hydraulic fluid in inlet line 26 for the carburetor responding transducer 202 is communicated to the actuating chamber 252, and at certain times communicated to the return spring fluid coupling chamber 232 by the washer 270; and that fluid pressure in the return spring fluid coupling chamber 232 is delivered to the inlet line 28 of the automatic transmission responding transducer 20 at all times through the axial passage 272, the bore 278 of the valve member 264, and the outlet passage 276.

In operation, fluid delivered to the actuating member 252 results in expansion of that chamber and consequent movement of the actuating piston 204 to the left will cause rightward movement of the valve actuating rod 242 by virtue of the abutment of the left end of the valve actuating rod 242 with the first stage spring retainer 220 so as to move the valve member 264 rightward with respect to the flange 268 and the washer 270 to communicate the fluid pressure in the inlet passage 274 to the axial passage 272, and consequently, to the return spring assembly fluid coupling chamber 232. Fluid continues to be communicated to the fluid coupling chamber 232 until the first stage piston spring retainer 220 is moved leftward by compression of the spring member 214 so as to close the openings between the valve member 264, the washer 270 and the radial outward flange 268. It will be appreciated that the fluid pressure within the coupling chamber 232 is, within practical limits, a function of the force provided by the spring member 214 solely, which in turn is a function of the compression thereof, i.e., the leftward movement of the first stage spring retainer 220. Continued introduction of fluid into the actuator chamber 252 as by continued depression of the accelerator pedal 14 causes additional leftward movement of the actuating piston 204 to again abut the left end of the actuating rod 242 against the first stage spring retainer 220, to thus again lift the first stage spring retainer 220 from the end of the actuator rod 242. The first stage spring member 214 will consequently be further compressed until such time that the force on the spring member 214 exceeds the precompression of the second stage spring member 216 to cause compression of the second stage spring member 216. The cycle is again repeated until the precompression of the third stage spring member 218 is exceeded at which time the third stage spring retainer 224 will lift from the tabs 226 to compress the third stage spring member 218. It is apparent that the fluid pressure within the actuating chamber 252 delivered on inlet line 26 is balanced by the combined force of the variable rate return spring assembly 210, the force exerted by the carburetor spring acting through crank arm 208 and following pin 206, and the frictional force of the throttle valve shaft also acting through crank arm 208 and following pin 206. On the other hand, the fluid pressure within the fluid coupling chamber 232 is balanced solely by the total force provided by the variable rate return spring assembly 210 on the first stage retainer 220. Since the carburetor spring force and the carburetor friction force are not factors, the pressure in the fluid coupling chamber 232, within practical tolerances, is only representative of the leftward displacement of the piston 204, and consequently, only representative of throttle opening, i.e., engine torque output.

The pressure within the fluid coupling chamber 232 is communicated to the automatic transmission responding transducer inlet line 28 through the axial passage 272 and the outlet passage 276. Therefore, it will be appreciated that the pressure delivered to the automatic transmission responding transducer 20 is, for all practical purposes, a function solely of the compression of the variable rate return spring assembly 210, and accordingly, is solely a function of the throttle valve opening. It will therefore be appreciated that the force provided by the carburetor friction, which may be highly variable from unit to unit, is effectively isolated from the pressure delivered to the automatic transmission responding transducer 20. Therefore, where carburetor friction may be a factor affecting the accuracy of the fluid pressure delivered to the automatic transmission responding transducer 20, it is preferred to use a carburetor responding transducer embodiment like that of FIG. 11 rather than one like that of FIG. 14 so as to compensate for carburetor friction thereby preventing the operation of the automatic transmission from being adversely affected thereby. It will be appreciated that regardless of the embodiment used, a pressure signal is generated within the liquid linkage which is used to control the shifting of the automatic transmission.

Automatic Transmission Responding Transducer—
First Embodiment

In FIG. 14, a first embodiment of a responding transducer 20 for the vehicle's automatic transmission is illustrated which receives fluid pressure signals representative of throttle opening from either the actuating transducer 12 or the carburetor responding transducer 202. The responding transducer 20 generally includes a pressure responsive actuator 302, a kick down pressure spool valve 304, and a throttle valve pressure spool valve 306. It will be understood that the pressure responsive actuator 302 may be used with either spool valve sections singly or in combination.

The pressure responsive actuator 302 includes a housing 308 having an internal cylindrical bore 310 with a closure member 312 therein secured from leftward movement by a snap ring 314. The closure member 312 has an inlet opening 316 receiving the transmission responding transducer inlet line 28 and an enlarged internal bore portion 318. The pressure responsive actuator 302 also includes a cylindrical member 320 which resides in a bore portion 322 of the housing 308 at its right exterior portion and threadedly engages a threaded bore portion 324 of the end closure member 312 at its left exterior portion. A rolling lobe diaphragm 326 is disposed between confronting radial shoulders on the end closure member 312 and the cylinder 320 so as to be sealingly engaged therewith to provide a fluid tight variable-volume chamber 328. The rolling lobe diaphragm 326 rests against one end of a piston 330 which resides in, and is guided by, a cylindrical bore 332 on the cylinder 320 formed by a radially inward extending flange. As will be appreciated in view of FIG. 14, the piston 330 is adapted for reciprocatory movement within the bore 332 in accordance with variations in the volume 328 caused by variations in internal fluid pressure transmitted thereto by inlet line 28. The other end of the piston 330 operates the spool valves 304 and 306 in a manner described below.

The transmission kick down pressure spool valve 304 includes a housing 334, which may be part of the transmission housing, and a main spool member 336. An operative connection is provided between the piston 330 of the pressure responsive actuator 302 and the main spool 336 by a washer 338 disposed therebetween for transmitting reciprocatory or translational motion of the piston 330 to the spool 336. The washer 338 is biased to the left against a housing flange by a precompressed coiled lag spring 340. By virtue of the precompression of the spring 340, the fluid pressure in volume 328 must attain a predetermined level, for example, 40 p.s.i., before movement of the piston 330 is effected.

The housing 334 has a kick down valve portion including a high pressure inlet port 342, a normally-open exhaust port 344 and a kick down pressure outlet port 346. The ports 344–346 are each provide dwith an associated chamber surrounding the spool 336. The chambers are separated by cylindrical bore portions or housing lands 348 and 350 having diameters adapted for close cooperation with a pair of cylindrical spool lands 352 and 354 on the spool 336. When the spool 336 is positioned as shown, communication between the kick down pressure outlet port 346 and the exhaust port 344 is provided such that the pressure at the kick down pressure outlet port 346 is minimized. Upon rightward movement of the piston 330, communication is effected between the inlet port 342 and the kick down outlet port 346 to deliver a kick down pressure to an appropriate actuator of the automatic transmission to cause the transmission to shift to a lower gear. It will be appreciated that kick down does not occur until after a predetermined fluid pressure in the volume 328 is attained in response to a corresponding predetermined accelerator pedal travel. The kick down spool valve 304 and the throttle valve pressure spool valve 306 are connected by a spool valve connecting apparatus 356 for operation of the throttle valve pressure spool valve 306 generally in accordance with movement of the spool 336 in a manner to be described in detail below. The throttle valve pressure spool valve 306 includes a spool 358 mounted in the housing 334 for reciprocatory movement therein. The housing 334 is provided with an inlet port 360, a pair of exhaust ports 362 and 364, and a throttle valve pressure outlet port 366. Each of the ports 360–366 are provided with an associated chamber surrounding the spool 358 as illustrated. The associated chambers are separated by housing cylindrical bore portions of reduced diameter or housing lands which closely cooperate with the lands 368–370 on the spool 358. The spool 358 is additionally provided with a reduced diameter right end portion 372 closely cooperating with the housing 334 to provide a substantial fluid seal between the exhaust passage 364 and a feedback chamber 374. The feedback chamber 374 communicates with the throttle pressure outlet port 366 through an axially extending passage 376 and a radially extending passage 378. The exhaust port 364 isolates the line pressure at inlet port 360 from the feedback port 374. In the throttle-closed position as shown, communication from the inlet port 360 to the throttle valve pressure outlet port 366 is prevented by the spool land 370. Upon rightward movement of the spool 358 effected by rightward movement of the spool 336 transmitted through the spool valve connecting apparatus 356, the line pressure at inlet port 360 will be communicated to the throttle valve pressure outlet port 366 thereby increasing the pressure at the port 366 and in its associated central chamber. This pressure is transmitted through the passages 378 and 376 to the feed-back chamber 374 to resist rightward movement. Leftward movement of the spool 358 communicates the throttle valve pressure outlet port 366 with the exhaust port 362 so as to relieve the pressure at the port 366. As is well known to those skilled in the automatic transmission art, the throttle valve pressure is used by conventional means in the automatic transmission for controlling the shift points of the transmission and the rate of engagement of the friction elements therein.

The spool valve connecting apparatus 356 includes a minimum pressure spring 380 and a maximum pressure spring 382, both of which are normally precompressed. The spring 380 resides in a cylindrical bore 384 so as to be laterally retained with respect to the spool 336. One end of the minimum pressure spring 380 abuts the spool 336 and the other end abuts a radially outwardly extending flange 386 on a maximum pressure spring retainer 388 so as to urge the retainer 388 toward the right under the influence of the precompression of spring 380. The maximum pressure spring retainer 388 is connected to the throttle valve pressure spool 358 by a stud 390 having a flanged head 392 engaged with a radially inward extending flange 394 on the maximum pressure spring retainer 388. Normally, the precompression of the spring 382 holds the maximum pressure spring retainer 388 fully extended as shown such that rightward movement of the spring retainer 388 effects an equal rightward movement of the spool 358 so as to provide an increase in throttle valve pressure at port 366. As the throttle valve pressure increases, the pressure in the feedback chamber 374 correspondingly increases so as to resist rightward movement of the spool 358 until a predetermined throttle valve pressure is attained, at which point, the precompression of the spring 382 is overcome so as to allow the maximum pressure spring retainer 388 to travel rightward with respect to the stud 390 limiting further movement of the spool valve 358 to the right. Therefore, it will be appreciated that the maximum pressure spring member 382, connected as shown, limits the throttle valve pressure to the aforementioned predetermined amount. This provision may be eliminated by providing a rigid connection between the maximum pressure spring retainer 388 and the spool 358.

The precompressed minimum pressure spring 380 maintains a rightward bias on the spool valve 358 so as to provide minimum throttle valve pressure at port 366 at all times. This provision, of course, could be eliminated by providing a rigid connection between the spool valve 336 and the maximum pressure spring retainer 388.

Automatic Transmission Responding Transducer—
Second Embodiment

In FIG. 15, a second embodiment of an automatic transmission responding transducer, indicated generally at 396, is shown receiving fluid pressure from either the actuating tansducer 12 or the carburetor responding transducer 202 on inlet line 28. The responding transducer 396 includes a generally pressure responsive actuator 398 and a throttle valve pressure spool valve 400 connected to the pressure responsive actuator 398 for operation thereby.

The pressure responsive actuator 398 includes a housing 402 with a cylindrical internal bore 404 having an end closure member 406 residing therein secured from rightward movement by a snap ring 408. The end closure member 406 is provided with an O-ring sealingly engaging the cylindrical bore 404 of the housing 402. The end closure member 406 has a central inlet bore 412 communicating with the inlet line 28 for delivering hydraulic fluid to an actuator chamber 414. The actuator chamber 414 is formed by an enlarged central bore 416 within the end closure member 406 and a rolling lobe diaphragm 418 for sealingly engaging a radial flange 420 on the end closure member 406. Particularly, a cylinder 422, threadedly engaged with a bore portion 424 of the end closure member 406, has a flange 426 confronting the radial flange 420 on the end closure member 406 which compressively engages the periphery of the rolling lobe diaphragm 418 so as to sealingly secure the rolling lobe diaphragm 418 between the radial shoulder 420 of the end closure member 406 and the flange 426 of the cylinder 422. A piston 428 is disposed in and closely cooperates with a cylindrical bore 430 of the cylinder member 422 for reciprocatory movement therewithin. As can be seen in FIG. 15, the rolling lobe diaphragm 418 engages one end of the piston 428 for movement thereof in response to expansions and retractions of the volume 414.

The piston 428 has internal bore 432 slidably mounting an operating rod 434 for reciprocatory movement therewithin. A connection between the piston 428 and the operating rod 434 comprising a washer 436 abutting the left end of the piston 428, a main spring retainer 438 slidably mounted on the operating rod 434 abutting the washer 436, a maximum pressure coil spring member 440 having one end abutting the main spring retainer 438 and an opposite end abutting the maximum pressure spring retainer 441, and a snap ring 442 engaging the operating rod 434 and abutting the main spring retainer 441 is provided such that leftward movement of the piston 428 normally causes leftward movement of the operating rod 434. The maximum pressure spring 440 is precompressed so as to normally abut the main spring retainer 438 against the snap ring 442 as shown. Initial movement of the piston 428 and the actuating rod 434 to the left is resisted by a lag spring 446 engaging the main spring retainer 438 at one end and a radial shoulder 448 on the housing 402 at its other end.

The pressure responsive actuator housing 402 is affixed to the main transmission housing 450, for example, by a threaded fitting 452 engaging a threaded bore 454 in the transmission housing 450. The operating rod 434 extends through the threaded fitting 452 so as to bring its left end into engagement with a spool 456 of the throttle valve pressure spool valve 400. Preferably, the left end 454 is provided with a conical section as shown engaging and centering with a central bore 458 in the spool 456. The housing 450 includes a line pressure inlet port 460, a throttle valve pressure outlet port 462 and an exhaust port 464. Each of the ports have an associated chamber surrounding the spool 456. The housing 450 further includes a feedback chamber 466 for receiving throttle valve pressure to oppose leftward movement of the spool 456. Each of the chambers is separated by a housing land portion as illustrated having a reduced diameter for closely cooperating with spool lands 468 and 470 on the spool 456. The spool 456 further includes an axially extending passage 472 and a radial passage 474 communicating the feedback chamber 466 with the central chamber containing the throttle valve pressure.

In operation, upon delivery of fluid pressure to the actuator chamber 414 from inlet line 28 which is sufficient to overcome the precompression of the coiled spring member 446, the piston 428 will move to the left also carrying the actuating rod 434 to the left. Leftward movement of the operating rod 434 causes like movement of the spool 456 so as to communicate the line pressure at inlet port 460 with the throttle valve pressure port 456 thereby increasing the throttle valve pressure. This leftward movement is opposed by a feedback connection through the passages 472 and 474 to the feedback chamber 466. Rightward movement of the piston 428 causes corresponding rightward movement of the spool valve 456 so as to relieve the throttle valve pressure by communicating the throttle valve pressure port 462 with the exhaust port 464. The maximum force which may be transmitted from the piston 428 through the operating rod 434 is limited to a predetermined value by compressive preloading of the spring 440 above the predetermined value the spring 440 will further compress so as to slidably move the main spring retainer 438 to the left with respect to the operating rod 434 to limit leftward movement of the spool 456, and accordingly, to limit the maximum throttle valve pressure at throttle valve port 462.

It will be apparent that small movements of the actuating pistons 330 and 428 of the automatic transmission responding transducers 20 and 396, respectively, provide changes in throttle valve pressure. Accordingly, relatively small amounts of hydraulic fluid need to be introduced to these chambers to effect these changes. Therefore, the automatic transmission responding transducers 20 and 396 may be provided with high rate lag springs such that they require small quantities of fluid for their operation. On the other hand, to provide wide-open throttle, relatively large quantities of fluid are needed to cause the required full excursions of the pistons 164 and 204 of the carburetor responding transducers 16 and 202, respectively, and therefore, the carburetor responding transducers 16 and 202 use low rate spring assemblies 138 and 210, respectively.

In view of the above discussion of exemplary hydraulic linkage systems according to this invention, it will now be appreciated that damage to any of the hydraulic lines between the respective devices does not cause the throttle to be held in a partially or fully open position. Particularly, when the fluid pressure on the inlet line 26 to the carburetor transducers 16 or 202 is relieved by breakage of one of the hydraulic lines in the system, the return spring assembly 138 or 210, respectively, will return the throttle shaft 122 to the fully-closed position. Accordingly, this invention is believed to provide a significant safety advantage over the mechanical linkages of the prior art which, on occasions in the past, have caused throttles to be stuck in a partially open position.

While it will be apparent that the teachings herein are well calculated to teach one skilled in the art the method of making the preferred embodiments of this invention, it will be appreciated that the invention is susceptible to modification, variation and change without departing from the proper scope or meaning of the subjoined claims.

What is claimed is:

1. For a vehicle having an engine including a carburetor with a throttle, accelerator means for positionally indicating desired vehicle throttle opening, and a transmission for the vehicle including signal responsive means for controlling the shifting of the transmission, an apparatus comprising: liquid linkage means interconnecting said accelerator means and said throttle for applying a force to change the position of said throttle in accordance with changes of the position of said accelerator means, and interconnecting said throttle and said transmission signal responsive means for providing a signal thereto reflecting the position of said throttle.

2. An apparatus according to claim 1 wherein said liquid linkage means includes:
   an actuating transducer operatively associated with said accelerator means for providing a pressure signal for said liquid linkage;
   a responding transducer operatively associated with said throttle for receiving said pressure signal provided by said actuating transducer to apply said force to change the position of said throttle; and
   a responding transducer operatively associated with said transmission signal responsive means for receiving a pressure signal from said liquid linkage means in response to said actuating transducer pressure signal for controlling the shifting of said transmission.

3. An apparatus according to claim 2 wherein said pressure signal received by said responding transducer for said transmission signal responsive means generally approximates the torque output of said engine.

4. An apparatus according to claim 3 wherein said responding transducer for said throttle comprises:
   means receiving said pressure signal from said actuating transducer for changing the position of said throttle in accordance with a pressure signal approximately related to the torque output of said engine to provide a liquid linkage means pressure signal approximately reflecting the torque output of the engine.

5. An apparatus according to claim 4 wherein said responding transducer for said throttle includes means providing a chamber including a movable wall, operatively associated with said throttle for changing the position thereof, to vary the volume of said chamber in accordance with said pressure provided by said actuating transducer.

6. An apparatus according to claim 5 wherein said responding transducer for said throttle further includes resilient means opposing movement of said wall means having a preloading and spring rate providing movement of said wall and consequent changing in said throttle position in approximate response to a pressure signal reflecting the torque output of said engine.

7. An apparatus according to claim 6 wherein said resilient means has a variable spring rate.

8. An apparatus according to claim 7 wherein said variable rate resilient means comprises first and second spring members, said first spring member having a preloading to provide resilient deformation thereof at a first pressure within said variable volume and said second spring member having a preloading providing resilient deformation thereof at a second higher predetermined pressure within said variable volume.

9. An apparatus according to claim 8 wherein said first spring member has a first spring rate, and said second spring member has a second lower spring rate.

10. An apparatus according to claim 7 wherein said variable rate resilient means comprises first, second and third spring members, said first spring member having a preloading to provide resilient deformation thereof at a first pressure within said variable volume, said second spring member having a preloading providing resilient deformation thereof at a second higher predetermined pressure within said variable volume, and said third spring member having a preloading providing resilient deformation thereof at a third higher predetermined pressure within said variable volume.

11. An apparatus according to claim 7 wherein said first spring member has a first spring rate, said second spring member has a second lower spring rate, and third spring has a third spring rate lower than said first and second spring rates.

12. An apparatus according to claim 5 wherein said responding transducer for said transmission includes means providing a chamber including a movable wall to vary the volume of said chamber in accordance with said liquid linkage means pressure signal, said movable wall being operatively associated with said transmission for controlling the shifting thereof.

13. An apparatus according to claim 12 further including a spool valve having a spool operatively connected to said movable wall of said responding transducer for said transmission for providing a fluid pressure for controlling the shifting of said transmission.

14. An apparatus according to claim 6 wherein said responding transducer for said throttle further includes fluid coupling means including a chamber interposed between said resilient means and said movable wall means such that the fluid pressure within said fluid coupling chamber is representative of compression of said resilient means, and therefore, the position of said throttle, said chamber providing said liquid linkage means pressure signal to said responding transducer for said transmission.

15. An apparatus according to claim 6 wherein said responding transducer for said throttle further includes piston means operatively associated with said throttle interposed between said movable wall and said resilient means for resilient deformation of said resilient means and movement to change the position of said throttle in accordance with movement of said movable wall.

16. An apparatus according to claim 15 wherein said responding transducer for said throttle includes means mounting said piston for reciprocatory movement.

17. An apparatus according to claim 16 wherein said throttle shaft includes a crank arm connected thereto and said piston means is operatively connected to said crank arm for rotation thereof.

18. An apparatus according to claim 14 wherein said responding transducer for said throttle includes piston means operatively associated with said throttle interposed between said movable wall and said fluid coupling means for providing movement of said fluid coupling, consequent resilient deformation of said resilient means and movement to change the position of said throttle in accordance with movement of said movable wall.

19. An apparatus according to claim 18 wherein said responding transducer for said throttle includes means mounting said piston for reciprocatory movement.

20. An apparatus according to claim 19 wherein said throttle shaft includes a crank arm connected thereto and said piston means is operatively connected to said crank arm for rotation thereof.

21. For a vehicle having accelerator means for positionally indicating a desired throttle opening and a transducer responsive to a pressure signal, an actuating transducer for said accelerator means comprising:
means providing a chamber including a movable wall for said chamber to vary the volume thereof, said chamber having an inlet opening and an outlet opening connected to said responding transducer for providing said pressure signal, said inlet opening communicating with a reservoir of fluid for said chamber;
means connecting said accelerator means and said movable wall for movement thereof to vary the volume of said chamber in accordance with the position of said accelerator means; and
valve means for said inlet opening being controlled by said movable wall for opening said valve when said movable wall is in a first position providing a first predetermined volume and being closed thereby when said movable wall is in a second position providing a second lesser predetermined volume.

22. The actuating transducer of claim 21 wherein said valve means includes a valve member having a valve portion movable by said movable wall for engaging said inlet opening upon said movement of said movable wall from said first to said second position thereby closing said inlet opening.

23. The actuating transducer of claim 22 wherein said valve member is resiliently compressible upon movement of said movable wall beyond said second position with said valve portion in engagement with said inlet opening.

24. For a vehicle having an engine including a carburetor with a throttle, an apparatus connected to said throttle for applying a force to change the position of said throttle comprising:
means providing a fluid chamber including a movable wall to vary the volume of said chamber in response to a fluid pressure signal;
means connecting said movable wall with said throttle for changing the position thereof in accordance with changes in the position of said movable wall;
resilient means operatively associated with said movable wall for providing changes in position of said movable wall in accordance with pressure signals approximately reflecting engine torque output as a consequence of corresponding throttle position.

25. An apparatus according to claim 24 wherein said resilient means has a variable spring rate.

26. An apparatus according to claim 25 wherein said variable rate resilient means comprises first and second spring members, said first spring member having a preloading to provide resilient deformation thereof at a first pressure within said variable volume and said second spring member having a preloading providing resilient deformation thereof at a second higher predetermined pressure within said variable volume.

27. An apparatus according to claim 26 wherein said first spring member has a first spring rate, and said second spring member has a second lower spring rate.

28. An apparatus according to claim 25 wherein said variable rate resilient means comprises first, second and third spring members, said first spring member having a preloading to provide resilient deformation thereof at a first pressure within said variable volume, said second spring member having a preloading providing resilient deformation thereof at a second higher predetermined pressure within said variable volume, and said third spring member having a preloading providing resilient deformation thereof at a third higher predetermined pressure within said variable volume.

29. An apparatus according to claim 28 wherein said first spring member has a first spring rate, said second spring member has a second lower spring rate, and third spring has a third spring rate lower than said first and second spring rates.

30. An apparatus according to claim 24 wherein said responding transducer for said throttle further includes fluid coupling means including a chamber interposed between said resilient means and said movable wall means such that the fluid pressure within said fluid coupling chamber is representative of compression of said resilient means, and therefore, the position of said throttle, said chamber for providing a pressure signal approximately representative of the torque output of said engine.

31. An apparatus according to claim 24 wherein said responding transducer for said throttle further includes piston means operatively associated with said throttle interposed between said movable wall and said resilient means for resilient deformation of said resilient means and movement to change the position of said throttle in accordance with movement of said movable wall.

32. An apparatus according to claim 31 wherein said responding transducer for said throttle includes means mounting said piston for reciprocatory movement.

33. An apparatus according to claim 32 wherein said throttle shaft includes a crank arm connected thereto and said piston means is operatively connected to said crank arm for rotation thereof.

34. An apparatus according to claim 30 wherein said responding transducer for said throttle includes piston means operatively associated with said throttle interposed between said movable wall and said fluid coupling means for providing movement of said fluid coupling, consequent resilient deformation of said resilient means and movement to change the position of said throttle in accordance with movement of said movable wall.

35. For a vehicle having an engine including a carburetor with a throttle and a transmission for the vehicle including a signal responsive means for controlling the shifting of said transmission, an apparatus comprising:
liquid linkage means interconnecting said throttle and said transmission signal responsive means for providing a signal thereto reflecting the position of said throttle.

36. An apparatus according to claim 35 wherein said liquid linkage means includes:
a transducer operatively associated with said throttle for providing a pressure signal representative of the position of said throttle; and
a responding transducer operatively associated with said transmission signal responsive means for receiving a pressure signal from said liquid linkage means for controlling the shifting of said transmission.

37. An apparatus according to claim 36 wherein said pressure signal received by said responding transducer for said transmission signal responsive means generally approximates the torque output of said engine.

38. An apparatus according to claim 36 wherein said transducer for said throttle includes means providing a chamber including a movable wall operatively associated with said throttle for varying the volume of said chamber in accordance with the position of said throttle.

39. An apparatus according to claim 38 wherein said transducer for said throttle further includes resilient means opposing movement of said wall means having a preloading and spring rate providing movement of said wall in response to changes in the position of said throttle to provide a pressure signal in said chamber approximately reflecting the torque output of said engine.

40. An apparatus according to claim 39 wherein said resilient means has a variable spring rate.

41. An apparatus according to claim 40 wherein said variable rate resilient means comprises first and second spring members, said first spring member having a preloading to provide resilient deformation thereof at a first pressure within said variable volume and said second spring member having a preloading providing resilient deformation thereof at a second higher predetermined pressure within said variable volume.

42. An apparatus according to claim 41 wherein said first spring member has a first spring rate, and said second spring member has a second lower spring rate.

43. An apparatus according to claim 42 wherein said variable rate resilient means comprises first, second and third spring members, said first spring member having a preloading to provide resilient deformation thereof at a first pressure within said variable volume, said second spring member having a preloading providing resilient deformation thereof at a second higher predetermined pressure within said variable volume, and said third spring member having a preloading providing resilient deformation thereof at a third higher predetermined pressure within said variable volume.

44. An apparatus according to claim 40 wherein said first spring member has a first spring rate, said second spring member has a second lower spring rate, and said third spring has a third spring rate lower than said first and second spring rates.

45. An apparatus according to claim 36 wherein said responding transducer for said transmission includes means providing a chamber including a movable wall to vary the volume of said chamber in accordance with said pressure signal from said fluid linkage means, said movable wall being operatively associated with said transmission for controlling the shifting thereof.

46. An apparatus according to claim 45 further including a spool valve having a spool operatively connected to said movable wall of said responding transducer for said transmission for providing a fluid pressure for controlling the shifting of said transmission.

References Cited

UNITED STATES PATENTS

| | | | |
|---|---|---|---|
| 2,599,214 | 6/1952 | Wemp | 74—868 X |
| 3,448,767 | 6/1969 | Wonn | 74—867 X |

ARTHUR T. McKEON, Primary Examiner